US008572396B2

(12) United States Patent
Ito

(10) Patent No.: US 8,572,396 B2

(45) Date of Patent: Oct. 29, 2013

(54) BIOMETRIC AUTHENTICATION DEVICE AND COMPUTER PRODUCT

(75) Inventor: Kimikazu Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1679 days.

(21) Appl. No.: 11/509,565

(22) Filed: Aug. 25, 2006

(65) Prior Publication Data

US 2007/0260887 A1 Nov. 8, 2007

(30) Foreign Application Priority Data

Apr. 28, 2006 (JP) ................................ 2006-126807

(51) Int. Cl.
*G06K 9/00* (2006.01)
*G06F 7/04* (2006.01)

(52) U.S. Cl.
USPC ........... 713/186; 382/115; 382/116; 382/117; 382/118; 726/27; 726/28

(58) Field of Classification Search
USPC ................. 713/186, 168–171, 176, 180–184; 726/27–28; 382/115–118
See application file for complete search history.

(56) References Cited

U.S. PATENT DOCUMENTS 6,140,939 A * 10/2000 Flick .......................... 340/12.28
6,709,333 B1 * 3/2004 Bradford et al. ................ 463/29
7,155,416 B2 * 12/2006 Shatford ......................... 705/67
7,161,465 B2 * 1/2007 Wood et al. .................... 340/5.2
7,315,232 B2 * 1/2008 Koike .......................... 340/5.52
7,404,081 B2 * 7/2008 Murashita ..................... 713/168
7,545,961 B2 * 6/2009 Ahern et al. .................. 382/115
7,567,689 B2 * 7/2009 Iwasaki ......................... 382/115
7,986,816 B1 * 7/2011 Hoanca et al. ................ 382/115
8,242,882 B2 * 8/2012 Ikegami ....................... 340/5.53
2002/0010862 A1 * 1/2002 Ebara ............................ 713/186
2002/0112177 A1 * 8/2002 Voltmer et al. ............... 713/200
2003/0159052 A1 * 8/2003 Lee et al. ...................... 713/186
2004/0064453 A1 * 4/2004 Ruiz et al. ......................... 707/9
2005/0210267 A1 * 9/2005 Sugano et al. ................ 713/186
2005/0226468 A1 * 10/2005 Deshpande et al. .......... 382/115

(Continued)

FOREIGN PATENT DOCUMENTS

CN 1367459 9/2002
DE 198 24 883 A1 12/1999

(Continued)

OTHER PUBLICATIONS

Office Action dated Jan. 9, 2009 corresponding to Chinese patent application No. 200610139221.2.

(Continued)

*Primary Examiner* — Eleni Shiferaw
*Assistant Examiner* — Phy Anh Vu
(74) *Attorney, Agent, or Firm* — Kratz, Quintos & Hanson, LLP

(57) ABSTRACT

When first biometric information is read with an ID number, a first authentication unit acquires second biometric information corresponding to the ID number from a first database, and authenticates when the first biometric information matches with the second biometric information. A transferring unit transfers the second biometric information from the first database to a second database when the authentication is successful. When the first biometric information is read without the ID number, a second authentication unit authenticates if at least one of the second biometric information in the second database matches with the first biometric information among.

10 Claims, 8 Drawing Sheets

(56) References Cited

U.S. PATENT DOCUMENTS

| | | | | |
|---|---|---|---|---|
| 2006/0038655 | A1 | 2/2006 | Hauke | 340/5.52 |
| 2006/0069923 | A1 * | 3/2006 | Ito et al. | 713/186 |
| 2006/0074872 | A1 * | 4/2006 | Gordon | 707/3 |
| 2006/0151599 | A1 * | 7/2006 | Awatsu et al. | 235/380 |
| 2007/0055888 | A1 * | 3/2007 | Miller et al. | 713/186 |
| 2007/0101154 | A1 * | 5/2007 | Bardsley et al. | 713/186 |

FOREIGN PATENT DOCUMENTS

| | | |
|---|---|---|
| JP | 6-52111 | 2/1994 |
| JP | 2001-76270 | 3/2001 |
| JP | 2001-227220 | 8/2001 |
| JP | 2001-236539 | 8/2001 |
| JP | 2002-213125 | 7/2002 |
| JP | 2002-342862 | 11/2002 |
| JP | 2003-346099 | 12/2003 |
| JP | 2004-68411 | 3/2004 |
| JP | 2004-118592 | 4/2004 |
| WO | WO 98/41947 | 9/1998 |
| WO | WO 99/06928 | 2/1999 |
| WO | WO 01/91038 | 11/2001 |
| WO | WO 02/35480 | 5/2002 |
| WO | WO 2005/010829 | 2/2005 |

OTHER PUBLICATIONS

European Search Report dated Jan. 18, 2010.

Office Action dated Jun. 21, 2011 corresponding to Japanese Patent Application No. 2006-126807 with English translation.

* cited by examiner

FIG.3

| USER ID | NAME | ADDRESS | ... | BIOMETRIC INFORMATION |
|---|---|---|---|---|
| 1001 | YAMADA ICHIRO | ASAO-KUxxx, KAWASAKI-SHI | ... | xxxxxx |
| 1002 | SUZUKI HANAKO | NAKAHARA-KUxxx, KAWASAKI-SHI | ... | xxxxxx |
| 1003 | KOIZUMI YOSHIO | YOKOSUKA-SHIxxx, KANAGAWA PREFECTURE | ... | xxxxxx |
| ... | ... | ... | ... | ... |

FIG.4

| USER ID | BIOMETRIC INFORMATION |
|---|---|
| 1003 | xxxxxx |
| ... | ... |

BIOMETRIC AUTHENTICATION DEVICE AND COMPUTER PRODUCT

BACKGROUND OF THE PRESENT INVENTION

1. Field of the Present Invention

The present invention relates to a technology for performing a biometric authentication by collating biometric information that is transmitted through a network with biometric information is registered in advance.

2. Description of the Related Art

In recent years, biometric authentication technology has been getting attention as a technology that easily and safely realizing a user authentication. The biometric authentication technology is a technology for authenticating a person through a reading of a fingerprint, veins in a palm, or the like by a sensor and a collation of the read fingerprint, veins, or the like with information that has been registered in advance.

In a conventionally implemented authentication using a password or an identification (ID) card, a person attempting to be authenticated is required to remember the password or carry the ID card. In addition, when the password or the ID card is lost or stolen, a third party can falsely perform authentication. Problems such as the above do not occur in the authentication using the biometric authentication technology.

A detailed application of the biometric authentication technology is disclosed in, for example, Japanese Patent Application Laid-open No. 2001-76270, in which the authentication is performed when an employee enters a building, using fingerprint information as a collation object. The fingerprint information is stored on an integrated-circuit (IC) card carried by the employee. When the authentication is successful, the fingerprint information is recorded in a temporary storage file within a server device. Therefore, after the employee enters the building, the authentication can be performed without using the IC card.

However, when biometric information, such as the fingerprint information and the like, are stored in the IC card and the biometric authentication is performed on the biometric information, there is a high risk of a third party pretending to be an owner of the IC card and being falsely authenticated, by counterfeiting or manipulating the IC card.

At the same time, when the biometric information is stored in a database or the like and is under strict centralized control, a collation of the biometric information takes time when registered persons increase. As a result, a sufficiently quick response time cannot be attained.

SUMMARY OF THE PRESENT INVENTION

It is an object of the present invention to at least partially solve the problems in the conventional technology.

A biometric authentication device according to one aspect of the present invention performs a biometric authentication by collating first biometric information read by a biometric information sensor with second biometric information registered in advance. The biometric authentication device includes a first authentication unit that, when the first biometric information is read with an identification number for identifying an object to be authenticated, acquires the second biometric information corresponding to the identification number from a first database in which biometric information of all objects to be authenticated is registered, collates the first biometric information with the second biometric information, and makes an authentication successful when the first biometric information matches with the second biometric information; a transferring unit that transfers the second biometric information corresponding to the identification number from the first database to a second database when the authentication by the first authentication unit is successful; and a second authentication unit that, when the first biometric information is read without the identification number, makes an authentication successful when there is at least one piece of biometric information matching with the first biometric information read without the identification number among the second biometric information stored in the second database.

A computer-readable recording medium according to another aspect of the present invention stores therein a computer program for performing a biometric authentication by collating first biometric information transmitted via a network with second biometric information registered in advance. The computer program causes a computer to execute first authenticating including, when the first biometric information is transmitted with an identification number for identifying an object to be authenticated, acquiring the second biometric information corresponding to the identification number from a first database in which biometric information of all objects to be authenticated is registered, collating the first biometric information with the second biometric information, and making an authentication successful when the first biometric information matches with the second biometric information; transferring, when the authentication by the first authentication unit is successful, the second biometric information corresponding to the identification number from the first database to a second database in which information on an object with the authentication successful at the first authenticating is stored; and second authenticating including, when the first biometric information is read without the identification number, acquiring the second biometric information stored in the second database in series, and making an authentication successful when there is at least one piece of biometric information matching with the first biometric information read without the identification number among the acquired second biometric information.

A biometric authentication device according to still another aspect of the present invention performs a biometric authentication by collating first biometric information read by a biometric information sensor with second biometric information registered in advance. The biometric authentication device includes a first authentication unit that, when the first biometric information is read with an identification number for identifying an object to be authenticated, acquires the second biometric information corresponding to the identification number from a database in which biometric information of all objects to be authenticated is registered, collates the first biometric information with the second biometric information, and makes an authentication successful when the first biometric information matches with the second biometric information; an identifier attaching unit that attaches an identifier to the second biometric information corresponding to the identification number in the database when the authentication by the first authentication unit is successful; and a second authentication unit that, when the first biometric information is read without the identification number, makes an authentication successful when there is at least one piece of biometric information matching with the first biometric information read without the identification number among the second biometric information to which the identifier is attached in the database.

The above and other objects, features, advantages and technical and industrial significance of this invention will be better understood by reading the following detailed description of presently preferred embodiments of the present invention, when considered in connection with the accompanying drawings.

BRIEF DESCRIPTION OF THE DRAWINGS

FIG. 3 is a table of an example of a user database;

FIG. 4 is a table of an example of a visitor database;

DETAILED DESCRIPTION OF THE PREFERRED EMBODIMENTS

Exemplary embodiments of the present invention are explained in detail below with reference to the accompanying drawings. According to the present embodiments, an example is explained in which the present invention is applied to a fitness club, although the application of the present invention is not limited to the fitness club.

Figure 1:
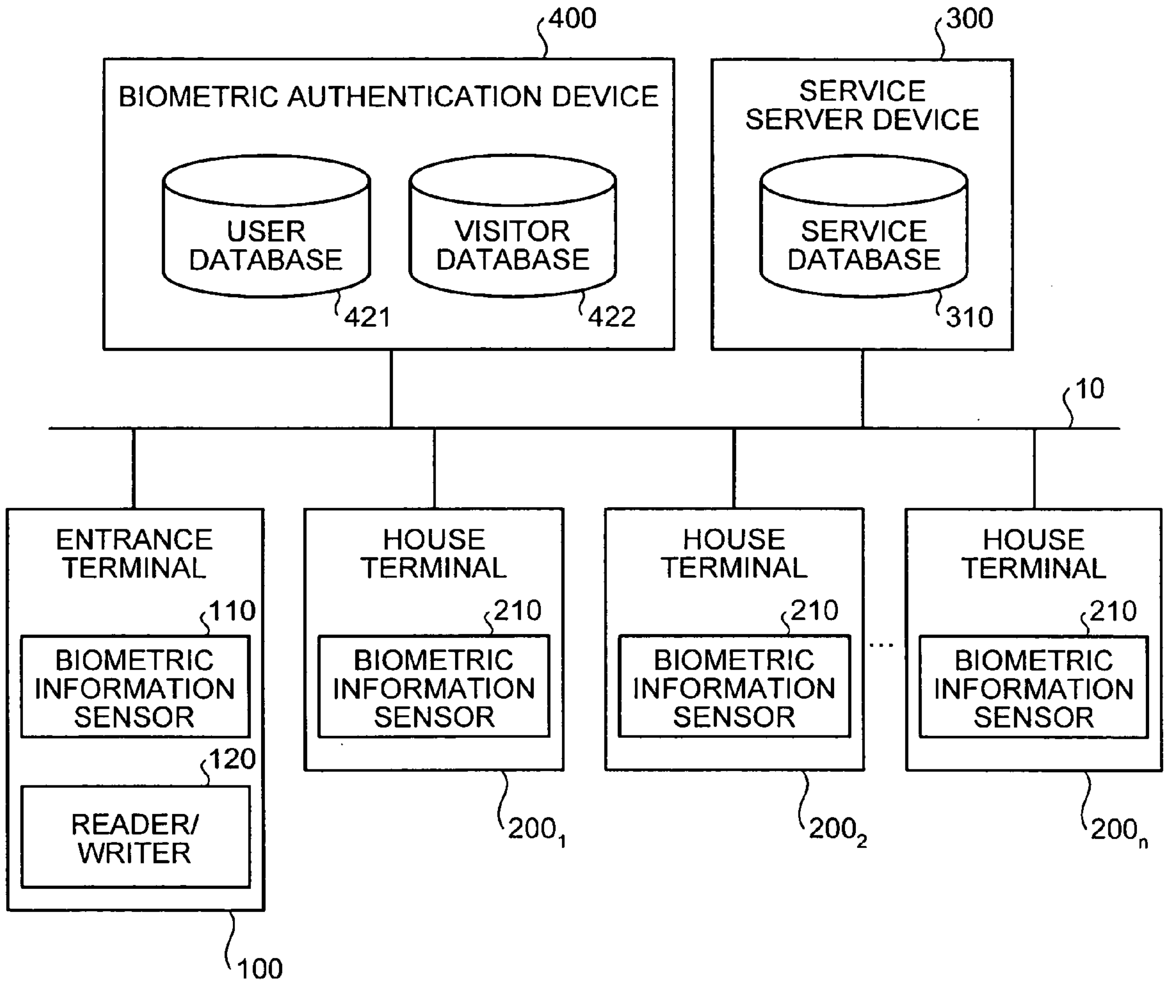
FIG. 1 is a schematic for illustrating an example of a biometric authentication system according to an embodiment of the present embodiment.

FIG. 1 is a schematic for illustrating an example of a biometric authentication system according to an embodiment of the present embodiment. The biometric authentication system according to the present embodiment includes an entrance terminal 100, house terminals $\mathbf{200}_1$ to $\mathbf{200}_n$, a service server device 300, and a biometric authentication device 400, connected via a network 10 such as a local area network (LAN).

Functions and the like of each device will be explained, giving the biometric authentication system used in the fitness club as the example. The entrance terminal 100 is used to check an entry and an exit of a user into and from the fitness club. The check is performed at an admissions counter. The entrance terminal 100 includes a biometric information sensor 110 and a reader/writer 120.

The biometric information sensor 110 reads, for example, veins in a palm. The veins in the palm contain a large amount of information. Therefore, a high authentication rate can be achieved. Falsification is difficult because the veins are body tissues. Furthermore, the veins can be read without contact, using near-infrared rays. Therefore, biometric authentication can be actualized in sanitary conditions.

The reader/writer 120 reads a user ID stored in an IC card. The IC card is issued to each user using the fitness club. The IC card stores the user ID that is used to identify the user possessing the IC card, and the like.

A medium storing the user ID can be another type of medium, such as a magnetic card, and the entrance terminal 100 can include a device that reads the user ID stored in the other medium, in place of the reader/writer 120. The entrance terminal 100 can include an input device used to input the user ID, such as a keypad, in place of or in addition to the reader/writer 120.

The house terminals $\mathbf{200}_1$ to $\mathbf{200}_n$ are used to perform an authentication of the user within the fitness club. The house terminals $\mathbf{200}_1$ to $\mathbf{200}_n$ include a biometric information sensor 210. The house terminals $\mathbf{200}_1$ to $\mathbf{200}_n$ are installed in various equipments within the fitness club. The biometric information sensor 210 reads, for example, the veins in the palm.

The service server device 300 provides various services to fitness club users and stores a usage status of the user. The service server device 300 includes a service database 310. The service database 310 stores information used to provide the various services and to store the usage status of the user.

The biometric authentication device 400 performs user authentication using biometric authentication technology, according to requests from the entrance terminal 100 and the house terminals $\mathbf{200}_1$ to $\mathbf{200}_n$. The biometric authentication device 400 also responds to a requesting terminal with an authentication result. The biometric authentication device 400 includes a user database 421 and a visitor database 422.

The biometric information (vein information in the present example) of all fitness club users and various attribute information are corresponded to the user ID and registered in the user database 421 in advance. The biometric information of users currently visiting the fitness club is corresponded to the user ID and temporarily registered in the visitor database 422. The biometric information registered in the user database 421 and the visitor database 422 is managed under strict control to prevent misappropriation.

When the user enters the fitness club, the biometric information sensor 110 reads the biometric information of the user. The reader/writer 120 reads contents of the IC card of the user. Then, the entrance terminal 100 transmits the read biometric information and user ID to the biometric authentication device 400 and requests authentication. When the authentication is successful, the user is permitted to enter the fitness club.

When a transmission of the biometric information and the user ID is received from the entrance terminal 100 and the user authentication is requested, the biometric authentication device 400 searches the user database 421, using the transmitted user ID as a key. The biometric authentication device 400 acquires the biometric information corresponding to the transmitted user ID. Then, the biometric authentication device 400 collates the acquired biometric information with the transmitted biometric information. If the acquired biometric information and the transmitted biometric information match, the authentication is successful. When the authentication is successful, information of an authentication subject is transferred from the user database 421 to the visitor database 422.

The biometric information of the authentication subject, among the biometric information registered in advance, is identified in this way, based on an identification number. The identified biometric information and the biometric information read by a sensor are collated, one-to-one, and the user authentication is performed. As a result, the user authentication can be performed quickly, even when a large amount of biometric information is registered in advance.

When the user uses the various equipments after entering the fitness club, the biometric information sensor 210 reads the biometric information of the user. The biometric information sensor 210 is included in each of the house terminals $\mathbf{200}_1$ to $\mathbf{200}_n$, installed in each piece of equipment. The user is authenticated and receives the various services.

For example, if the user is authenticated when using a training apparatus in a gym, measurement data, evaluation results, and the like of the user are correlated with the user ID and registered in the service database 310 of the service server device 300. Measurement results and the like registered in the service database 310 are outputted when the user operates the house terminals $200_1$ to $200_n$ upon being authenticated. The measurement results and the like are analyzed, using past information, and outputted.

When the user participates in a class requiring reservation, reservation information registered in the service database 310 and the user ID are collated by the being authenticated. Whether the user can participate in the class is judged. When the user purchases food and drinks, payment can be settled afterwards.

When the transmission of biometric information from the house terminals $200_1$ to $200_n$ is received and the user authentication is requested, the biometric authentication device 400 sequentially acquires the biometric information from the visitor database 422 and collates the acquired biometric information with the transmitted biometric information. When a match is found, the authentication is successful. The biometric authentication device 400 responds to the requesting terminal with the registered user ID corresponding to the biometric information. Then, the house terminals $200_1$ to $200_n$ transmit the returned user ID to the service server device 300 and requests for a performance of a required service.

It is considered that the user does not wish to carry unnecessary items, including the IC card, after entering the fitness club, if possible. Therefore, it is not preferable for the user authentication to be performed using a combination of the IC card and the user authentication. Having the user enter the user ID on the keypad or the like every time the user authentication is performed involves complicated operations for the user, and therefore, is not preferable.

At the same time, when the biometric authentication device 400 sequentially acquires the biometric information registered in the user database 421 and collates the acquired biometric information with the biometric information read by the biometric information sensor 210, a time required to obtain the authentication result increases as the amount of registered biometric information increases. As a result, the user authentication becomes impractical.

Therefore, when the user authentication is requested by the house terminals $200_1$ to $200_n$, after the user authentication is requested by the entrance terminal 100 and the authentication is successful, the biometric authentication device 400 sequentially acquires the biometric information registered in the visitor database 422 and collates the acquired biometric information with the transmitted biometric information, as described above. If the match is found, the authentication is successful. The user ID of the authentication subject and the biometric information are corresponded to and registered in the visitor database 422.

Although the visitor database 422 stores the biometric information of all users currently visiting the fitness club, the amount of biometric information is less than the amount of biometric information registered in the user database 421. The authentication is performed with the biometric information stored in the visitor database 422 as a collation object. Therefore, the time required to obtain the authentication result can be shortened to a practical range.

When the entrance terminal 100 requests the user authentication, the authentication subject is not identified. However, when the house terminals $200_1$ to $200_n$ request the user authentication, the authentication subject has already been authenticated during entrance and is identified. Therefore, when the house terminals $200_1$ to $200_n$ request the user authentication, all that is required is to determine who the authentication subject is among the users registered in the visitor database 422.

When the house terminals $200_1$ to $200_n$ request the user authentication, the biometric authentication can be performed with reduced accuracy than when the entrance terminal 100 requests the user authentication. Therefore, an authentication response speed can be enhanced.

When the house terminals $200_1$ to $200_n$ request the user authentication, the authentication response speed can be enhanced using an authentication processing system that differs from that used when the entrance terminal 100 requests the user authentication. The authentication processing system can process the authentication at a high speed, though the accuracy is relatively low. In this case, the user database 421 is corresponded to the biometric information for when the entrance terminal 100 requests the user authentication and the biometric information for when the house terminals $200_1$ to $200_n$ request the user authentication with the user ID. Then, the user database 421 stores the corresponding biometric information and user ID. The visitor database 422 is corresponded to the biometric information for when the house terminals $200_1$ to $200_n$ request the user authentication with the user ID. Then, the visitor database 422 stores the corresponding biometric information and the user ID.

When the house terminals $200_1$ to $200_n$ request the user authentication, a cost of deploying a system can be reduced by a use of an authentication processing system differing from that used when the entrance terminal 100 requests the user authentication. The authentication processing system can be deployed at a low cost. In this case, as well, the user database 421 is corresponded to the biometric information for when the entrance terminal 100 requests the user authentication and the biometric information for when the house terminals $200_1$ to $200_n$ request the user authentication with the user ID. Then, the user database 421 stores the corresponding biometric information and user ID. The visitor database 422 is corresponded to the biometric information for when the house terminals $200_1$ to $200_n$ request the user authentication with the user ID. Then, the visitor database 422 stores the corresponding information and user ID.

When the user exits the fitness club, the biometric information sensor 110 provided in the entrance terminal 100 reads the biometric information of the user. The user is authenticated and, an exiting process, such as a return of the IC card, is performed. When the biometric information for exiting the fitness club is read, the entrance terminal 100 transmits the biometric information to the biometric authentication device 400 and requests for a deletion of the information of the user registered in the visitor database 422.

When the transmission of the biometric information and the request for the deletion of the biometric information is received from the entrance terminal 100, the biometric authentication device 400 sequentially acquires the biometric information registered in the visitor database 422 and collates the acquired biometric information with the transmitted biometric information. If a match is found, the biometric authentication device 400 deletes data corresponding to the biometric information from the visitor database 422. In this way, excessive growth of the visitor database 422 can be prevented. In addition, the response time can be kept short when the house terminals $200_1$ to $200_n$ request the user authentication.

In the explanation above, the biometric information sensor 110 and the biometric information sensor 210 are explained as sensors that read biometric information on the veins in the palm. However, the sensors can be other types of sensors, such as a fingerprint sensor.

Figure 2:
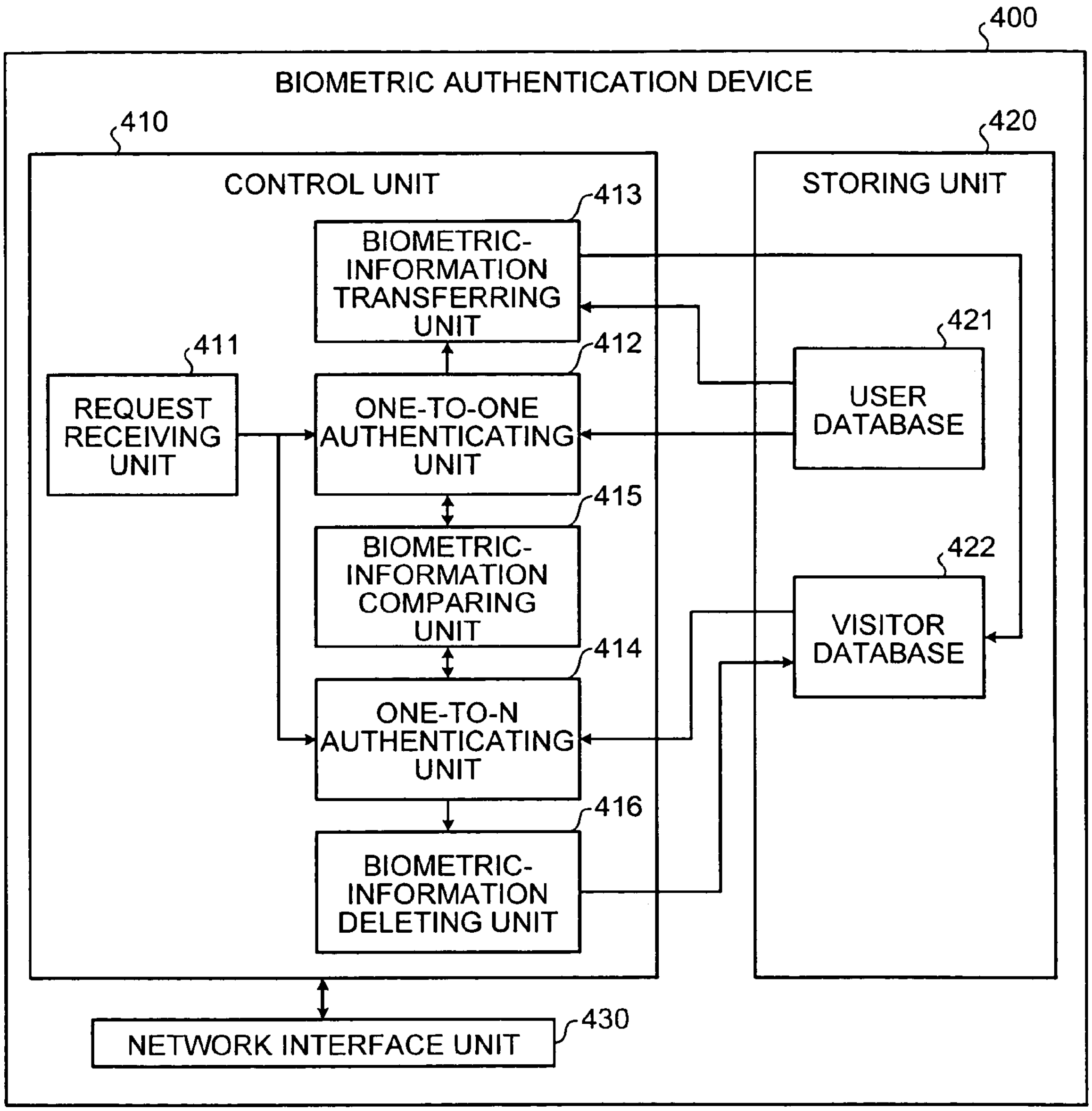
FIG. 2 is a functional block diagram of a biometric authentication device according to the present embodiment.

FIG. 2 is a functional block diagram of the biometric authentication device 400. The biometric authentication device 400 includes a control unit 410, a storing unit 420, and a network interface unit 430. The network interface unit 430 is an interface unit used to exchange various pieces of information, via a network.

The control unit 410 performs overall control of the biometric authentication device 400. The control unit 410 includes a request receiving unit 411, a one-to-one authenticating unit 412, a biometric-information transferring unit 413, a one-to-N authenticating unit 414, a biometric-information comparing unit 415, and a biometric-information deleting unit 416.

The request receiving unit 411 receives the user authentication request and the like from the entrance terminal 100 and the house terminals $\mathbf{200}_1$ to $\mathbf{200}_n$. Depending on the content of the request, the request receiving unit 411 assigns the received request to the one-to-one authenticating unit 412 or the one-to-n authenticating unit 414.

The one-to-one authenticating unit 412 performs an authentication process when the user ID and the biometric information of the authentication subject are transmitted from the entrance terminal 100 and the user authentication is requested. When the user authentication is requested, the one-to-one authenticating unit 412 first searches the user database 421 of the storing unit 420 and acquires the biometric information corresponding to the transmitted user ID. If no corresponding information is found in the user database 421, the one-to-one authenticating unit 412 responds to the requesting terminal that the user ID is not valid.

When the biometric information corresponding to the transmitted user ID is acquired, the biometric-information comparing unit 415 compares the acquired biometric information with the transmitted biometric information. Then, when judged that the acquired biometric information and the transmitted biometric information match, the biometric-information comparing unit 415 is responded to the requesting terminal that the authentication is successful. The biometric-information comparing unit 415 instructs the biometric-information transferring unit 413 to transfer the information of the authentication subject from the user database 421 to the visitor database 422 in the storing unit 420. When judged that the acquired biometric information and the transmitted biometric information do not match, the biometric-information comparing unit 415 responds to the requesting terminal that the authentication has failed.

The biometric-information transferring unit 413 transfers information of an identified subject from the user database 421 to the visitor database 422, according to an instruction from the one-to-one authenticating unit 412. The information transferred by the biometric-information transferring unit 413 includes at least the user ID used to identify the subject and the biometric information of the subject required for the user authentication by the one-to-n authenticating unit 414.

The one-to-n authenticating unit 414 performs an authentication process when the biometric information of the authentication subject is transmitted from the house terminals $\mathbf{200}_1$ to $\mathbf{200}_n$ and the user authentication is requested. When the user authentication is requested, the one-to-n authenticating unit 414 sequentially acquires the biometric information registered in the visitor database 422. The biometric-information comparing unit 415 compares the acquired biometric information and the transmitted biometric information.

When judged that any of the acquired biometric information matches with the transmitted biometric information, the one-to-n authenticating unit 414 responds to the requesting terminal that the authentication is successful. The one-to-n authenticating unit 414 also responds with the user ID that is stored in correspondence with the biometric information that is judged to match. When judged that none of the acquired biometric information matches with the transmitted biometric information, the one-to-n authenticating unit 414 responds to the requesting terminal that the authentication has failed.

The response time of the authentication request is largely dependent on an order in which the biometric information is acquired from the visitor database 422. Therefore, the one-to-n authenticating unit 414 acquires the biometric information by giving priority to the biometric information, of which a large amount of time as elapsed since a match with the transmitted biometric information has been recognized, based on a least-recently-used (LRU) algorithm. This is because it is considered that there will be a brief period before the user that has once been authenticated is authenticated again.

When the biometric information of the authentication subject is transmitted from the entrance terminal 100 and a request for the deletion of the information of the subject from the visitor database 422 is received, the one-to-n authenticating unit 414 is assigned the request. In this case, the one-to-n authenticating unit 414 sequentially acquires the biometric information registered in the visitor database 422. The biometric-information comparing unit 415 compares the acquired biometric information and the transmitted biometric information.

When it is judged that any of the acquired biometric information matches with the transmitted biometric information, the one-to-n authenticating unit 414 instructs the biometric-information deleting unit 416 to delete the information corresponding to the stored biometric information that is judged to match from the visitor database 422. When judged that none of the acquired biometric information matches with the transmitted biometric information, the one-to-n authenticating unit 414 responds to the requesting terminal that a deletion subject is not present.

The biometric-information comparing unit 415 compares two pieces of biometric information, such as vein information, and judges whether both pieces match. In FIG. 2, the biometric-information comparing unit 415 is shared between the one-to-one authenticating unit 412 and the one-to-n authenticating unit 414. However, the one-to-one authenticating unit 412 and the one-to-n authenticating unit 414 can respectively include a processing unit that is equivalent to the biometric-information comparing unit 415. In this case, the processing units that are equivalent to the biometric-information comparing unit 415 can respectively use different biometric authentication systems.

The biometric-information deleting unit 416 deletes information corresponding to specific biometric information from the visitor database 422, according to an instruction from the one-to-n authenticating unit 414. The biometric-information deleting unit 416 can have a function that autonomously organizes data in the visitor database 422 to prevent omission of the deletion of the information from the visitor database 422 for some reason and the excessive growth of the visitor database 422. For example, the biometric-information deleting unit 416 can have a function that deletes all data in the visitor database 422 at a predetermined time.

The storing unit 420 stores various pieces of information and includes the user database 421 and the visitor database 422. Information of all users that may become the authentication subject is registered in advance in the user database 421. Information of the user who has been authenticated by the one-to-one authenticating unit 412 is transferred from the user database 421 to the visitor database 422.

FIG. 3 is a table of an example of the user database 421. The user ID used to identify the user, attribute information of the user, such as a name and address of the user, and the biometric information of the user are registered in the user database 421 for each user.

FIG. 4 is a table of an example of the visitor database 422. The user ID used to identify the user and the biometric information of the user are registered in the visitor database 422 for each user. The visitor database 422 is not required to hold all items managed by the user database 421. The visitor database 422 only holds items required for processing.

The visitor database 422 can be divided into a plurality of tables and managed. For example, the visitor database 422 can be divided into a table for important clients and a table for other clients and managed.

In this case, when transferring the information of the user to the visitor database 422, the biometric-information transferring unit 413 references the attribute information of the user stored in the user database 421 and judges to which table the biometric information is stored. Then, if the one-to-n authenticating unit 414 is configured to preferentially read the biometric information of the table for important clients, the response time of when an important client is authenticated can be shortened, and satisfaction of the important client can be enhanced.

In addition, for example, if the user is under a contract to use only a gym and another user is under a contract to use only a pool, the visitor database 422 can be divided into a table for users that can use the gym and a table for users that can use the pool. In this case, the information of the user under a contract to use both the gym and the pool is stored in both tables. By the division of the visitor database 422 into tables, the amount of information stored in each table can be reduced, thereby shortening the response time for user authentication.

The user database 421 and the visitor database 422 are not necessarily required to be included in the biometric authentication device 400. One or both of the databases can be held in another device connected via the network. The biometric authentication device 400 can access the databases via the network.

Figure 5:
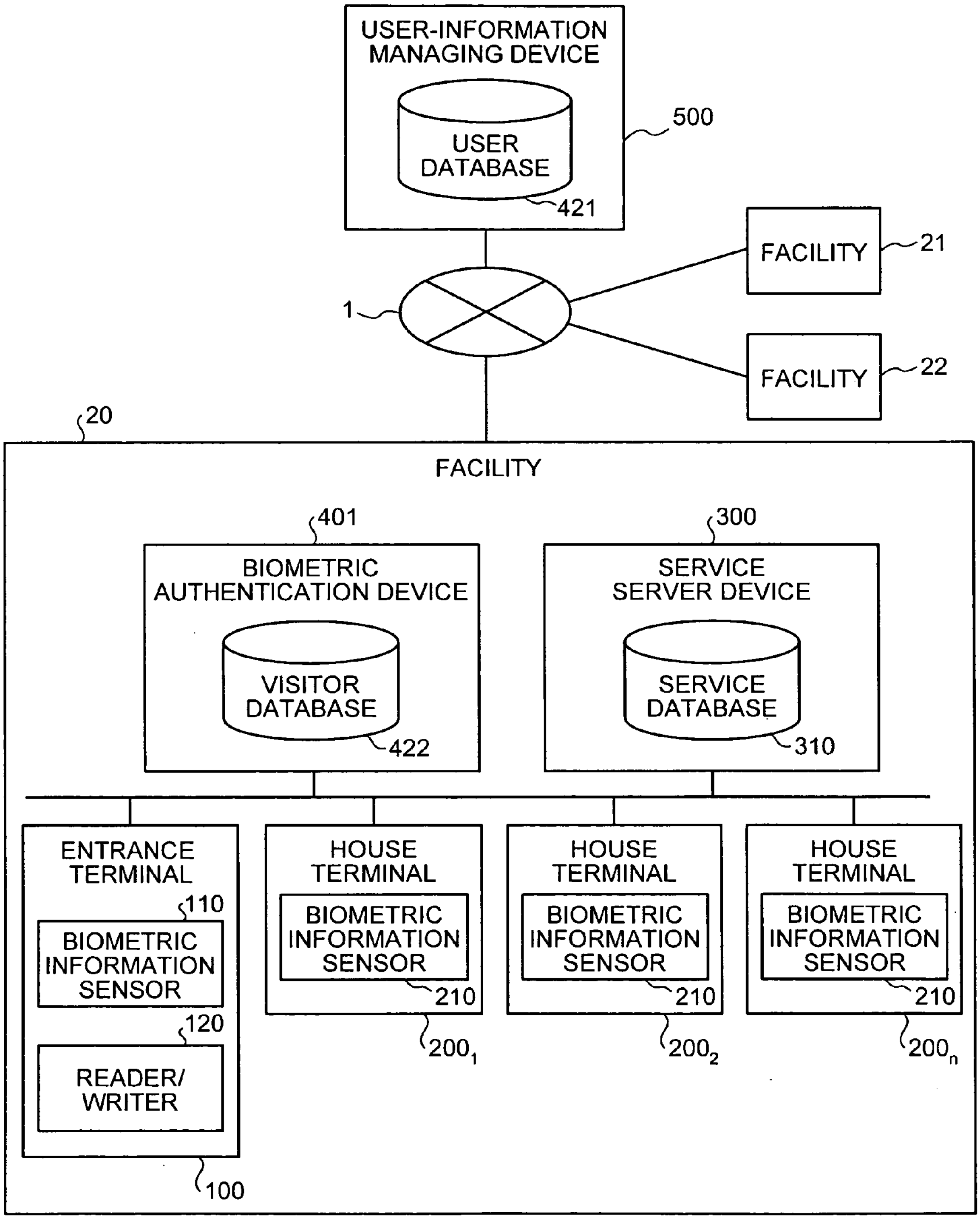
FIG. 5 is a schematic for illustrating another example of the biometric authentication system according to the present embodiment.

For example, as shown in FIG. 5, facilities 20 to 22 having a same system as the biometric authentication system in FIG. 1 can be connected via a network 1, such as the internet. The facilities 20 to 22 can share the user database 421 held in a user-information managing device 500 connected by the network 1. In this case, the facilities 20 to 22 include a biometric authentication device 401 that does not include the user database 421.

In a system that performs centralized management of the user database 421 and decentralized management of the visitor database 422, steps required for management can be reduced, compared when the user database 421 is managed for each facility. In addition, data items transferred from the user database 421 to the visitor database 422 are narrowed down to a required minimum number of items. Therefore, high-speed processing of the overall system and a reduced load can be actualized.

Figure 6:
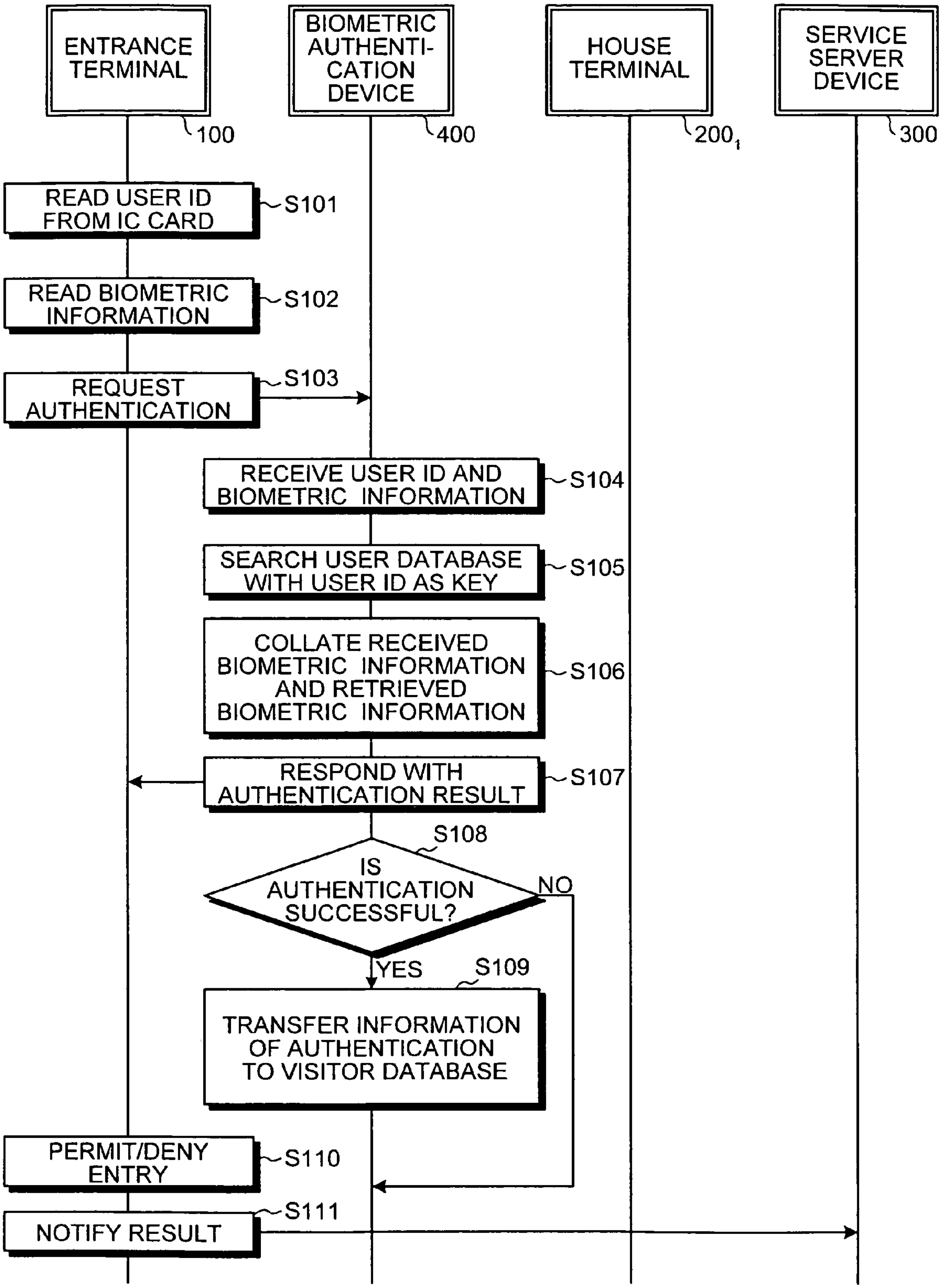
FIG. 6 is a flowchart of a processing procedure when a user enters a facility.

FIG. 6 is a flowchart of a processing procedure when the user enters the fitness club. When the user requests entry, the entrance terminal 100 reads the user ID from the IC card owned by the user, via the reader/writer 120 (Step S101). The biometric information sensor 110 reads the biometric information of the user (Step S102). Then, the entrance terminal 100 transmits the read user ID and the biometric information to the biometric authentication device 400 and requests for the user authentication (Step S103).

When the user ID and the biometric information are received (Step S104), the biometric authentication device 400 searches the user database 421 with the received user ID as the search key and acquires the biometric information corresponding to the transmitted user ID (Step S105). When the biometric information corresponding to the transmitted user ID is acquired, the biometric-information comparing unit 415 compares the acquired biometric information and the transmitted biometric information (Step S106).

When it is judged that the acquired biometric information and the transmitted biometric information match, the biometric-information comparing unit 415 responds to the requesting terminal that the authentication is successful; when judged that the acquired biometric information and the transmitted biometric information do not match, the biometric-information comparing unit 415 responds to the requesting terminal that the authentication has failed (Step S107). When the authentication is successful (Step S108; Yes), the biometric-information transferring unit 413 transfers the information of the authentication subject from the user database 421 to the visitor database 422 (Step S109).

At the same time, the entrance terminal 100 that receives the response from the biometric authentication device 400 decides whether to allow entry, depending on the authentication result (Step S110). The entrance terminal 100 notifies the service server device 300 of the decision and the service server device 300 stores the notified decision (Step S111).

Figure 7:
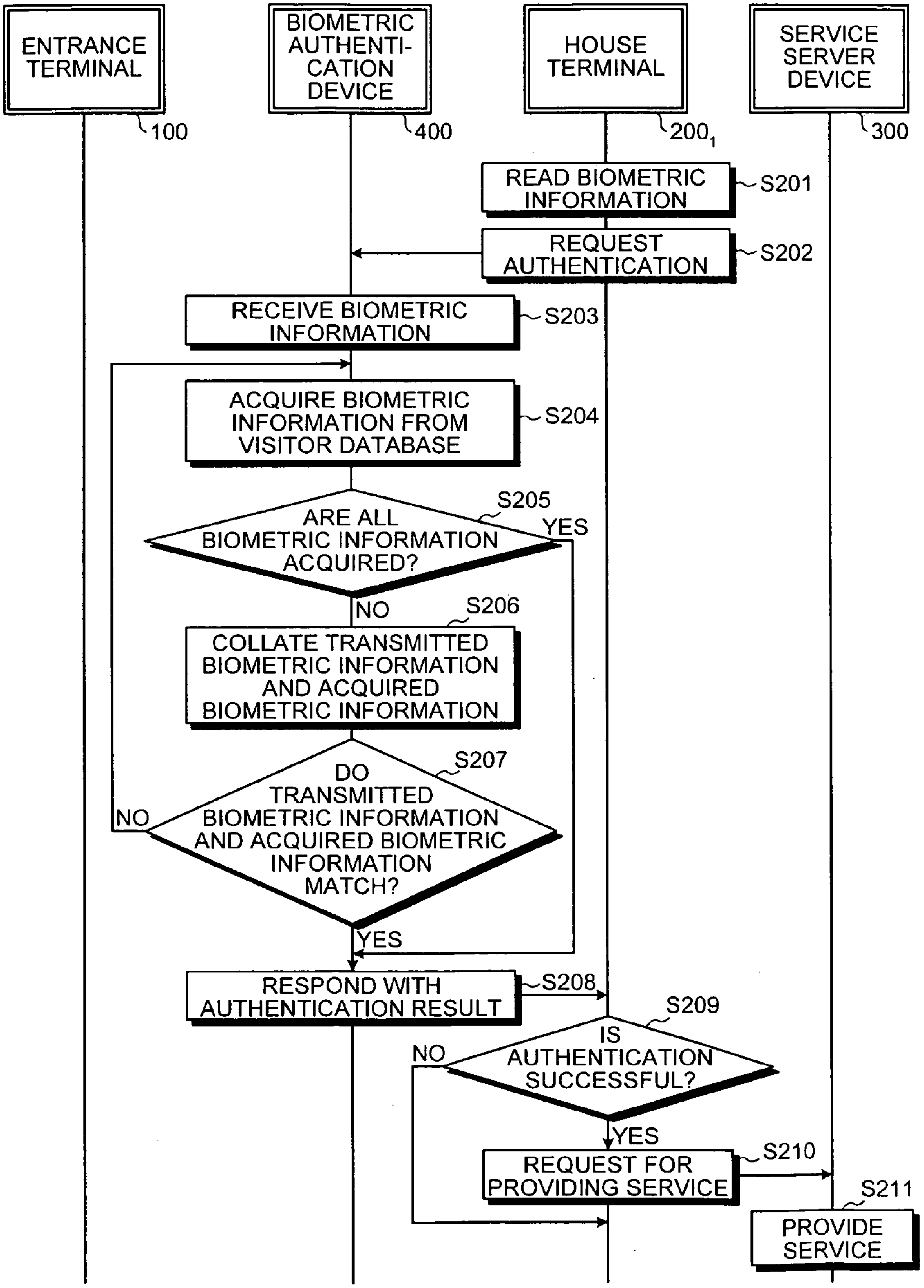
FIG. 7 is a flowchart of a processing procedure when the user receives a service in the facility.

FIG. 7 is a flowchart of a processing procedure when the user receives a provision of a service within the facility. When the user requests for the provision of the service, the house terminals 200$_1$ to 200$_n$ reads the biometric information of the user, via the biometric information sensor 210 (Step S201). Then, the house terminals 200$_1$ to 200$_n$ transmit the read biometric information to the biometric authentication device 400 and requests for the user authentication (Step S202).

When the biometric information is received (Step S203), the biometric authentication device 400 acquires one-piece of unprocessed biometric information from the visitor database 422 (Step S204). If all biometric information are already acquired (Step S205; Yes), the biometric authentication device 400 responds to the requesting terminal that the authentication has failed (Step S208).

When the unprocessed biometric information is acquired from the visitor database 422 (Step S205; No), the biometric-information comparing unit 415 compares the acquired biometric information and the transmitted biometric information (Step S206). When judged that the acquired biometric information and the transmitted biometric information match (Step S207; Yes), the biometric-information comparing unit 415 responds to the requesting terminal that the authentication is successful. The biometric-information comparing unit 415 also responds with the user ID corresponding to the stored biometric information that is judged to match (Step S208). When judged that the acquired biometric information and the transmitted biometric information do not match (Step S207; No), the processes are repeated from Step S204.

At the same time, if the house terminals 200$_1$ to 200$_n$ receiving the response from the biometric authentication device 400 receives a response that the authentication is successful (Step S209), the house terminals 200$_1$ to 200$_n$ request the provision of the service from the service server device 300 (Step S210). The service server device 300 performs the requested provision of the service (Step S211).

Figure 8:
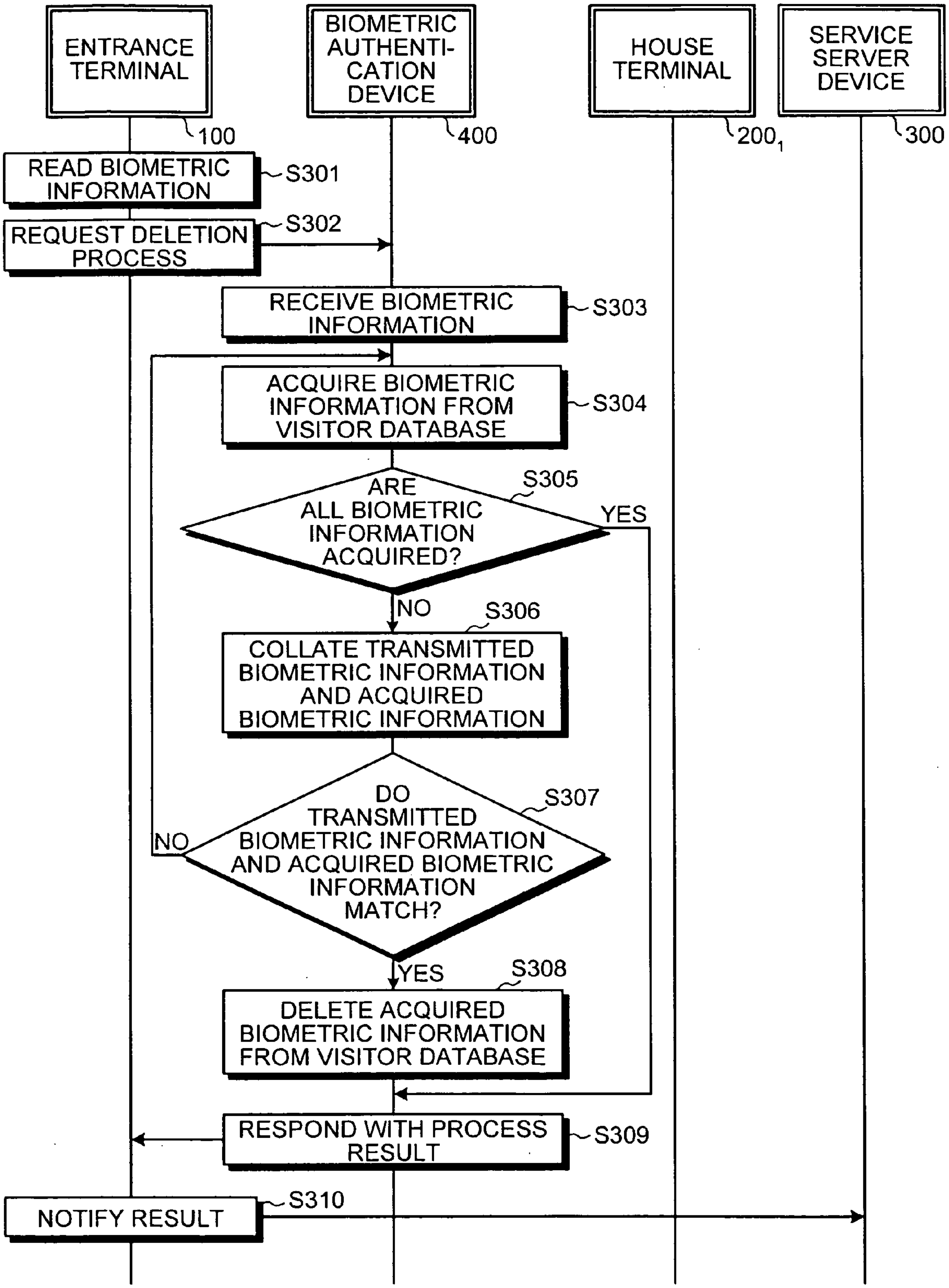
FIG. 8 is a flowchart of a processing procedure when the user exits the facility.

FIG. 8 is a flowchart of a processing procedure when the user exits the fitness club. When the user requests exit processing, the entrance terminal 100 reads the biometric information of the user, via the biometric information sensor 110 (Step S301). Then, the entrance terminal 100 transmits the read biometric information to the biometric authentication device 400 and requests that the information of the user be deleted from the visitor database 422 (Step S302).

When the biometric information is received (Step S303), the biometric authentication device 400 acquires one piece of unprocessed biometric information from the visitor database 422 (Step S304). If all biometric information are already acquired (Step S305; Yes), the biometric authentication device 400 responds to the requesting terminal that the deletion subject is not present (Step S309).

When the unprocessed biometric information is acquired from the visitor database 422 (Step S305; No), the biometric-information comparing unit 415 compares the acquired biometric information and the transmitted biometric information (Step S306). When judged that the acquired biometric information and the transmitted biometric information match (Step S307; Yes), the biometric authentication device 400 instructs the biometric-information deleting unit 416 to delete the stored biometric information corresponding to the acquired biometric information (Step S308). The biometric authentication device 400 responds to the requesting terminal that the deletion is successful (Step S309). When judged that the acquired biometric information and the transmitted biometric information do not match (Step S307; No), the processes are repeated from Step S304.

At the same time, the entrance terminal 100 that receives the response from the biometric authentication device 400 notifies the service server device 300 of the response result, and the service server device 300 stores the response result (Step S310).

The functions of the biometric authentication device 400 explained in the embodiment above can be realized by executing a biometric authentication program provided in advance by a computer.

Figure 9:
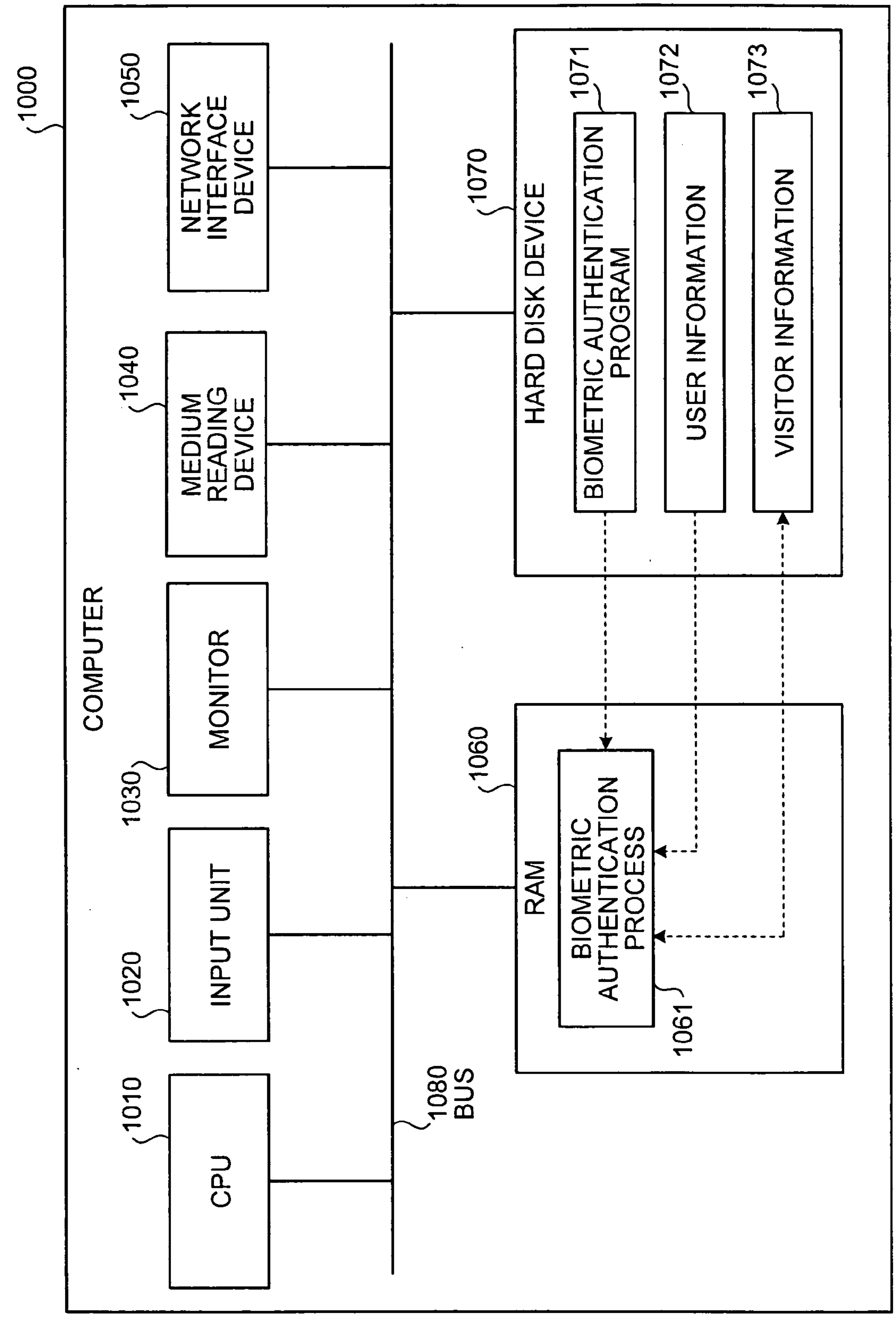
FIG. 9 is a functional block diagram of a computer executing a biometric authentication program.

FIG. 9 is a functional block diagram of a computer 1000 that executes a biometric authentication program 1071. The computer 1000 includes a central processing unit (CPU) 1010, an input unit 1020, a monitor 1030, a medium reading device 1040, a network interface device 1050, a random access memory (RAM) 1060, and a hard disk device 1070, connected via a bus 1080. The CPU 1010 executes various arithmetic processes. The input unit 1020 receives data input from the user. The medium reading device 1040 reads the program and the like from a recording medium storing various programs and the like. The network interface device 1050 performs an exchange of information with other computers, via the network. The RAM 1060 temporarily stores various pieces of information.

The hard disk device 1070 stores the biometric authentication program 1071, user information 1072, and visitor information 1073. The biometric authentication program 1071 has the same function as the control unit 410, shown in FIG. 2. The user information 1072 is corresponded to the user database 421. The visitor information 1073 is corresponded to the visitor database 422. One or both of the user information 1072 and the visitor information 1073 can be distributed accordingly and stored in other computers connected via the network.

The CPU 1010 reads the biometric authentication program 1071 from the hard disk device 1070 and expands the biometric authentication program 1071 in the RAM 1060. As a result, the biometric authentication program 1071 can function as a biometric authentication process 1061. The biometric authentication process 1061 expands the information and the like, read from the user database 421 and the visitor database 422 in an area within the RAM 1060 allocated to the biometric authentication process 1061. The biometric authentication process 1061 also performs various data processing based on the expanded data and the like.

The biometric authentication program 1071 is not necessarily required to be stored in the hard disk device 1070. The biometric authentication program 1071 that is stored in the recording medium, such as a compact disk-read only memory (CD-ROM), can be read and executed by the computer 1000. In addition, the biometric authentication program 1071 can be stored in another computer (or a server) or the like that is connected to the computer 1000, via a public circuit, the LAN, or a wide-area network (WAN). The biometric authentication program 1071 can be read from the other computers by the computer 1000 and executed.

As described above, the one-to-one authenticating unit 412 and the one-to-n authenticating unit 414 are provided in the present embodiment. The one-to-one authenticating unit 412 corresponds to the identification number (user ID) with the biometric information and collates the identification number (user ID) and the biometric information, one-to-one, while the biometric information is centrally managed in the user database 421. The one-to-n authenticating unit 414 performs the authentication using only the biometric information in the visitor database 422, to which only the biometric information of the users that have been authenticated by the one-to-one authenticating unit 412 is transferred. Therefore, the user authentication can be performed easily and quickly, while safely managing the biometric information.

According to the present embodiment, an example is explained in which the biometric information, authenticated by one-to-one authentication performed when the user enters the fitness club, is transferred from the user database 421 to the visitor database 422. However, an identifier of some sort can be attached to the biometric information authenticated by the one-to-one authentication in the user database 421. The subsequent one-to-N authentication process can be performed using the biometric information to which the identifier is attached within the user database 421, without transferring the biometric information.

According to an embodiment of the present invention, a first authentication unit and a second authentication unit are provided. The first authentication unit collates biometric information, one-to-one, in combination with an identification number. The biometric information is centrally managed in a first database. The second authentication unit performs authentication using only biometric information in a second database. Only the biometric information that is authenticated by the first authentication unit is transferred to the second database. Therefore, biometric authentication can be easily and quickly performed, while safely managing the biometric information.

Furthermore, according to an embodiment of the present invention, information of biometric information, of which authentication using the second database is unnecessary, is deleted from the second database. Therefore, excessive growth of the second database can be prevented, and performance speed of the biometric authentication can be maintained at a high speed.

Moreover, according to an embodiment of the present invention, when information in the first database is transferred to the second database, a table to which the information is stored is switched depending on contents of the information. Information is divided among a plurality of tables and stored. Therefore, objects of the collation performed by the second authentication unit can be restricted and an authentication process can be performed at a higher speed.

Furthermore, according to an embodiment of the present invention, a first authentication unit and a second authentication unit are provided. The first authentication unit collates biometric information, one-to-one, in combination with an identification number. The biometric information is centrally managed in a first database. The second authentication unit performs authentication of only biometric information having an identifier. The identifier is only attached to the biometric information that is authenticated by the first authentication unit. Therefore, the biometric authentication can be easily and quickly performed, while safely managing the biometric information.

Although the present invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A biometric authentication device that performs a biometric authentication, the biometric authentication device comprising:

a receiving unit that receives a request to identify an object to be authenticated, and determines whether the request is assigned to a one-to-one authentication or a one-to-N authentication according to whether or not the request includes an identification information of the object with first biometric information of the object;

a first authentication unit that, when the request includes the identification information of the object to be assigned to the one-to-one authentication, acquires second biometric information corresponding to the identification information from a first database in which biometric information of all objects to be authenticated is registered, collates the first biometric information received with the acquired second biometric information, and makes an authentication successful when the first biometric information matches with the acquired second biometric information;

a transferring unit that transfers, when the first authentication unit makes the authentication successful, the second biometric information used in the successful authentication from the first database to a second database and stores the transferred second biometric information in the second database; and a second authentication unit that, when the request does not include the identification information to be assigned to the one-to-N authentication, makes an authentication successful when there is at least one piece of biometric information matching with the first biometric information received among the transferred second biometric information stored in the second database.

2. The biometric authentication device according to claim 1, further comprising:

a deleting unit that, when biometric information is transmitted from a predetermined transmission source from among a plurality of transmission sources of biometric information that are located at different locations, deletes the second biometric information matching with the transmitted biometric information and information corresponding to the second biometric information matching with the transmitted biometric information from the second database.

3. The biometric authentication device according to claim 1, wherein upon transferring the second biometric information corresponding to the identification information from the first database to the second database, the transferring unit references attribute information stored in the first database in association with the second biometric information, and switches tables for storing the second biometric information depending on the attribute information in association with the second biometric information.

4. The biometric authentication device according to claim 1, wherein the second authentication unit uses a biometric authentication system with a processing speed faster than that of the first authentication unit.

5. The biometric authentication device according to claim 1, wherein the second authentication unit performs the authentication with an accuracy lower than that of the first authentication unit, to process the authentication faster than the first authentication unit.

6. The biometric authentication device according to claim 1, wherein the second authentication unit decides an order of acquiring the second biometric information from the second database based on a least-recently-used algorithm.

7. The biometric authentication device according to claim 1, wherein the first database is shared with other biometric authentication device connected via a network.

8. The biometric authentication device according to claim 1, wherein upon transferring the second biometric information corresponding to the identification information from the first database to the second database, the transferring unit transfers a minimum item required for the authentication from the first database to the second database.

9. A non-transitory computer-readable recording medium that stores therein a computer program for performing a biometric authentication, wherein the computer program causes a computer to execute a process comprising:

receiving a request to identify an object to be authenticated;

determining whether the request is assigned to a one-to-one authentication or a one-to-N authentication according to whether or not the request includes an identification information of the object with first biometric information of the object;

first authenticating including, when it is determined that the request includes identification information to be assigned to the one-to-one authentication at the determining, acquiring second biometric information corresponding to the identification information from a first database in which biometric information of all objects to be authenticated is registered;

collating the first biometric information received with the second biometric information acquired; and making an authentication successful when the first biometric information matches with the second biometric information;

transferring, when the authentication is successful, the second biometric information used in the successful authentication from the first database to a second database;

storing the transferred second biometric information in the second database;

second authenticating including, when it is determined that the request does not include the identification information to be assigned to the one-to-N authentication at the determining, making an authentication successful when there is at least one piece of biometric information matching with the first biometric information received among the transferred second biometric information stored in the second database.

10. A biometric authentication device that performs a biometric authentication, the biometric authentication device comprising:

a receiving unit that receives a request to identify an object to be authenticated, and determines whether the request is assigned to a one-to-one authentication or a one-to-N authentication according to whether or not the request includes an identification information of the object with first biometric information of the object;

a first authentication unit that, when the request includes the identification information to be assigned to the one-to-one authentication, acquires second biometric information corresponding to the identification information from a database in which biometric information of all objects to be authenticated is registered, collates the first biometric information received with the acquired second biometric information, and makes an authentication successful when the first biometric information matches with the second biometric information;

an identifier attaching unit that attaches an identifier to the second biometric information matching with the first authentication information in the database when the authentication by the first authentication unit is successful; and a second authentication unit that, when the request does not include the identification information to be assigned to the one-to-N authentication, makes an authentication successful when there is at least one piece of biometric information matching with the first biometric information received among the second biometric information to which the identifier is attached in the database.

* * * * *